United States Patent

[11] 3,586,363

| | | |
|---|---|---|
| [72] | Inventor | Emil T. Omlid<br>Twin Falls, Idaho |
| [21] | Appl. No. | 859,066 |
| [22] | Filed | Sept. 18, 1969 |
| [45] | Patented | June 22, 1971 |
| [73] | Assignee | Gary M. Wolverton<br>Twin Falls, Idaho<br>a part interest |

[54] EXPANDED FUEL SUPPLY SYSTEM FOR PICKUP TRUCKS
8 Claims, 5 Drawing Figs.

[52] U.S. Cl. .................................................. 296/1R,
137/575, 280/5 A
[51] Int. Cl. ................................................ B60k 15/06
[50] Field of Search............................................ 296/1 R;
280/5 A, 152; 244/135; 220/5 A, 86; 137/571, 575

[56] References Cited
UNITED STATES PATENTS
2,376,336  5/1945  Brown........................... 280/5 (A)
3,071,287  1/1963  Gran............................. 220/86

FOREIGN PATENTS
902,228  1/1954  Germany................... 280/5 (A)

Primary Examiner—Benjamin Hersh
Assistant Examiner—Leslie J. Paperner
Attorneys—Clarence A. O'Brien and Harvey B. Jacobson ABSTRACT: An enlarged fuel supply for pickup trucks of the type conventionally including a fuel tank mounted beneath the load bed of the pickup truck and provided with filler and vent pipes projecting upwardly from the fuel tank through the load bed floor forwardly of the rear wheel wells of the pickup truck and directed outwardly through a sidewall of the load bed at an elevation spaced above the load bed floor. The enlargement portion of the fuel supply includes a supplemental fuel tank mounted on the upper surface of the load bed floor forward of one of the wheel wells and upwardly through which the filler and vent pipes of the conventional tank extend with the top and bottom walls of the supplemental tank sealed relative to the adjacent outer surfaces of the pipes and the latter vented to the interior of the supplemental tank.

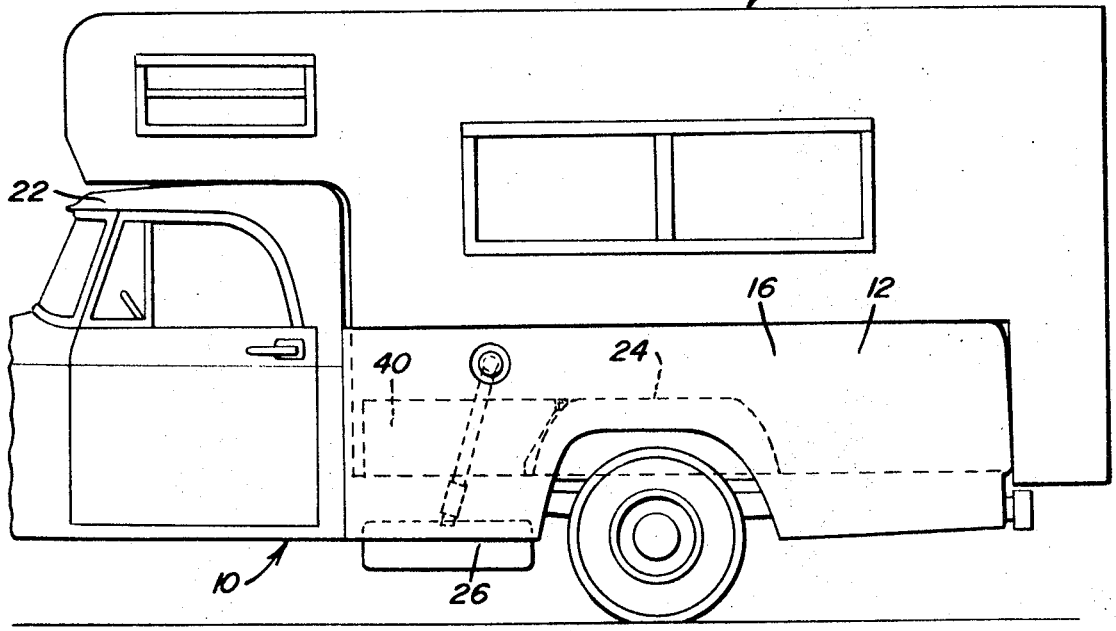
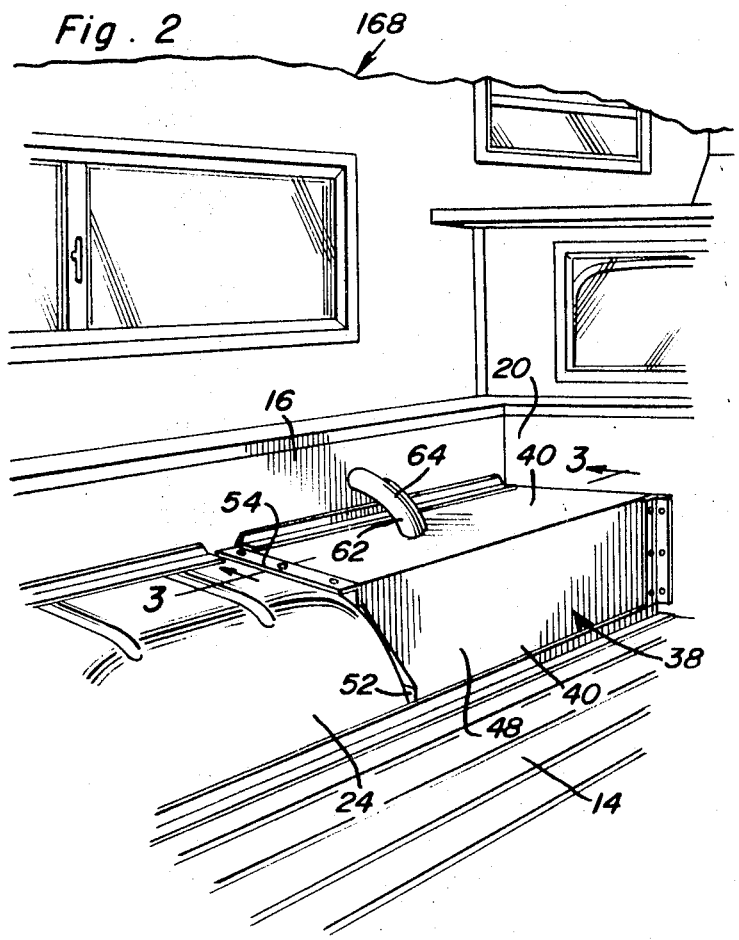
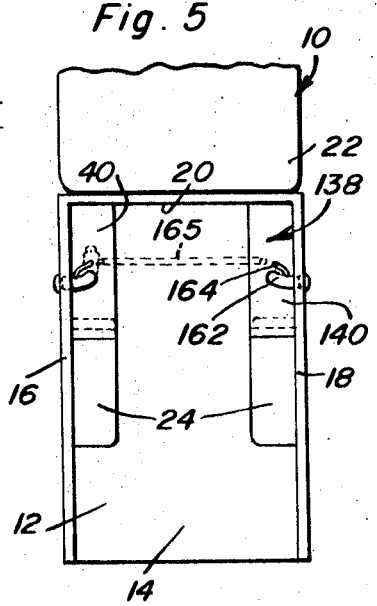
Emil T. Omlid
INVENTOR.

Emil T. Omlid
INVENTOR.

3,586,363

EXPANDED FUEL SUPPLY SYSTEM FOR PICKUP TRUCKS

While commercially available motor vehicles such as pickup trucks are provided with fuel tanks capable of holding sufficient fuel to propel the vehicle approximately 300 miles under average road conditions, pickup trucks and some other vehicles are often utilized as camping vehicles and travel over remote roads and paths many miles distant from the nearest gasoline station. Accordingly, inasmuch as a pickup truck having a camper body supported therefrom is considerably heavier than an unladen pickup truck and gasoline mileage realized is appreciably reduced because of the added load of the camper body and traveling over mountain roads and paths consumes greater amounts of fuel than highway travel, the 300 mile range of a conventional pickup truck without refilling is drastically reduced. In addition, when traveling over mountain roads at slow speed and under heavy load conditions, it is possible for a pickup truck or the like to be tilted to one side or the other whereby the inlet end of the gas line extending from the fuel tank is elevated above the level of fuel within the tank even though at least several gasolines of fuel remain in the tank. Accordingly, it is possible, when having only a quarter full gasoline tank, for a laden pickup truck to run out of gas while navigating a narrow mountain road.

Accordingly, it may be seen that there is a definite need for increasing the fuel capacity of a pickup truck or the like used for camping purposes. Of course, extra fuel may be carried in gasoline cans but most camper bodies occupy substantially all interior space of the load bed of a pickup truck and it is not desirable to carry cans of fuel within a camper body. Further, carrying extra fuel within separate cans which may be poured into the conventional fuel tank of a pickup truck does not alleviate the problem of running out of gas as a result of the pickup truck being tilted to one side while still having a quarter of a tank of fuel therein.

Therefore, the main object of this invention is to provide a means whereby a pickup truck utilized to support a camper body may be provided with a greatly increased fuel capacity.

Another object of this invention, in accordance with the immediately preceding object, is to provide an expanded fuel supply system for pickup trucks and the like which will still be operative, by the conventional gasoline gauge of the truck, to indicate the remaining portion of fuel within the conventional fuel tank after the additional fuel capacity provided by the expanded fuel supply system of the instant invention has been exhausted.

A still further object of this invention is to provide an expanded fuel supply system for pickup trucks utilized to carry camper bodies which will in no way interfere with the loading of a conventional camper body on the pickup truck or provide an expanded fuel supply by means of exteriorly mounted tanks which might readily become damaged when traveling over unimproved roads.

A final object of this invention in accordance with the preceding objects is to provide an expanded fuel supply system for pickup trucks which will conform to conventional forms of manufacture, be of simple construction and easy to install so as to provide a device that will be economically feasible, long lasting and relatively trouble-free in installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of a conventional form of pickup truck having a camper body mounted thereon and which has been modified to include an expanded fuel supply system;

FIG. 2 is a fragmentary perspective view of the inside of the load bed of the pickup truck showing the manner in which the supplemental tank of the expanded fuel supply system may be mounted within a pickup truck load bed so as not to interfere with the loading of the camper body on the pickup truck;

FIG. 5 is a top plan view of a pickup truck whose fuel supply has been further expanded by the utilization of a pair of supplemental fuel tanks.

Figure 3:
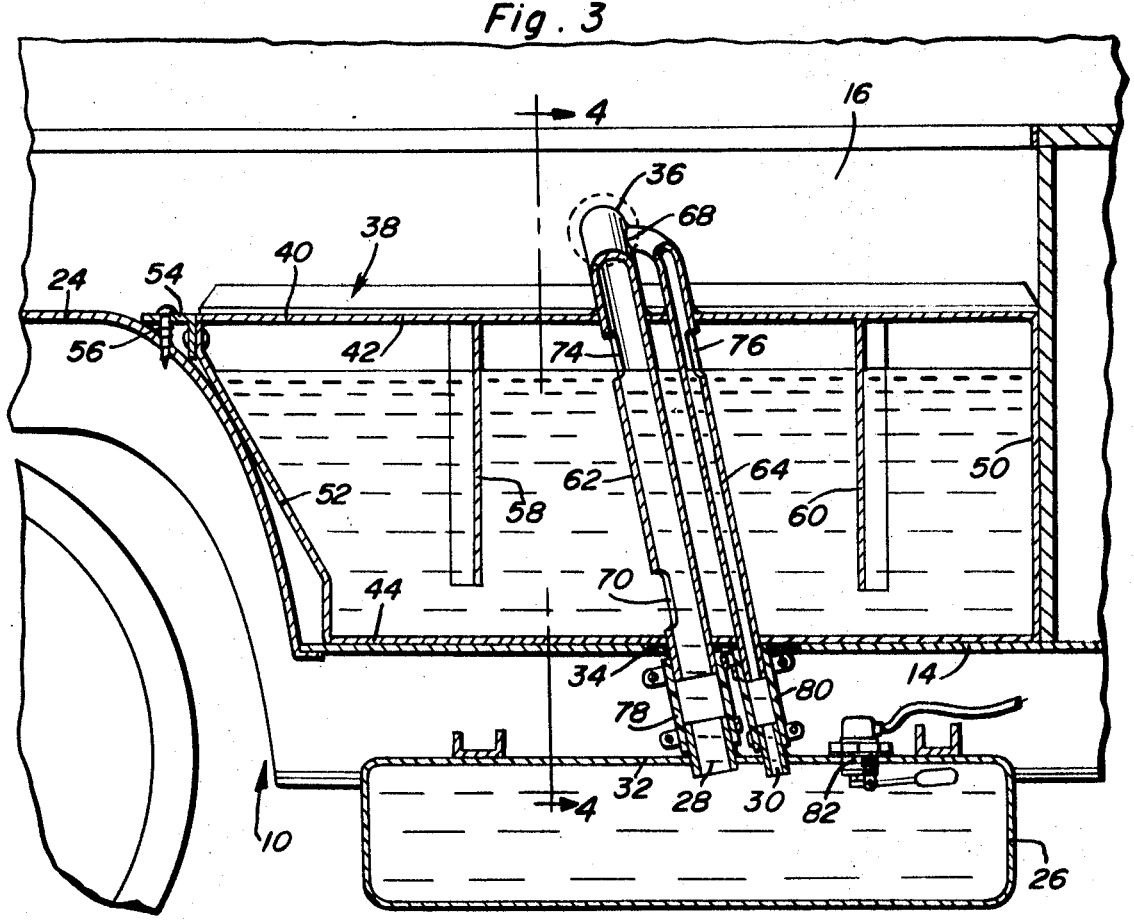
FIG. 3 is a fragmentary enlarged vertical sectional view taken substantially upon the plane indicated by the section line 3-3 of FIG. 2.
Figure 4:
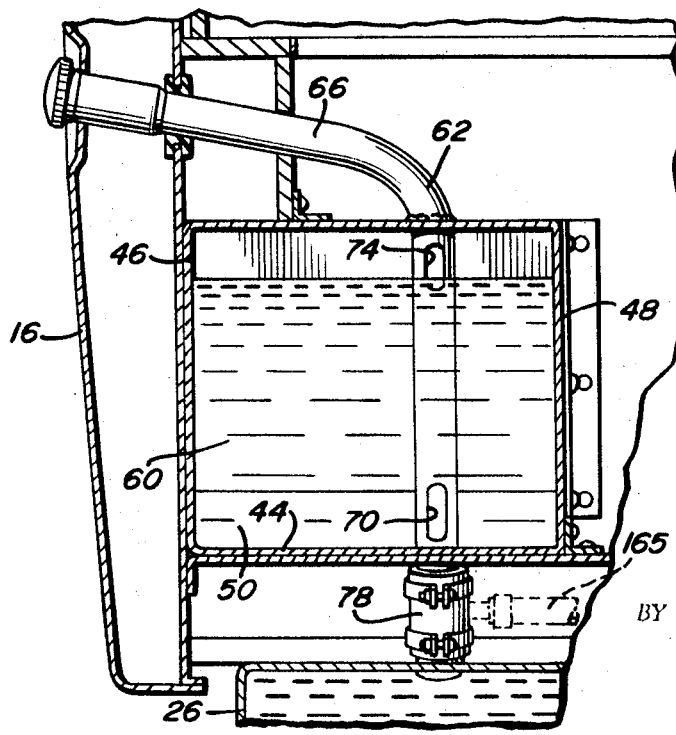
FIG. 4 is a fragmentary transverse vertical sectional view taken substantially upon the plane indicated by the section line 4-4 of FIG. 3.

Referring now more specifically to the drawings, the numeral 10 generally designates a conventional form of pickup truck which includes a load bed 12 provided with a bottom wall 14, opposite sidewalls 16 and 18 and a front wall 20 disposed immediately to the rear of the cab 22 of the pickup truck 10.

The load bed 12 further includes opposite side wheel wells 24 which project upwardly into the load space defined by the load bed 12 and which are spaced rearward of the front wall 20 of the load bed 12.

The pickup truck 12 is conventionally provided with a fuel tank 26 positioned beneath the bottom wall or floor 14 of the load bed 12 and which includes a filler pipe 28 and a vent pipe 30 which project upwardly through the top wall 32 of the tank 26 and through an opening 34 in the floor 14 of the load bed 12. The pipes 28 and 30 conventionally project upwardly above the floor 14 and the filler pipe 28 conventionally extends outwardly through an opening 36 in the sidewall 16 of the load bed 12.

The expanded fuel supply system of the instant invention is referred to in general by the reference numeral 38 and includes a first supplemental tank 40 including top and bottom walls 42 and 44, opposite sidewalls 46 and 48 and front and rear end walls 50 and 52. The supplemental tank 40, see FIG. 3, is contoured to be received forward of the left-hand wheel well 24 on the floor 14 of the load bed 12. The rear end of the tank 40 includes a transverse mounting bracket 54 which is secured to the wheel well 24 in any convenient manner such as by fasteners 56. In addition, the top wall 42 of the tank 40 is provided with depending baffles 58 and 60 which are spaced longitudinally of the top wall 42 and are also secured along their opposite side vertical edge portions to the sidewalls 46 and 48 of the tank 40. Further, the tank 40 includes a filler pipe 62 and a vent pipe 64 which extend downwardly through the top and bottom walls 42 and 44 of the tank and which are sealingly secured to the top and bottom walls 42 and 44. The upper end of the vent pipe 64 opens into a laterally directed upper end portion 66 of the filler pipe 62 as at 68 and the filler pipe 62 is vented to the lower portion of the interior of the tank 40 by means of a lower opening 70 formed therein and into an upper portion of the tank 40 by means of an upper opening 74 formed therein. In addition, the upper end of the vent pipe 64 is vented to the upper portion of the tank 40 by means of an opening 76.

The lower ends of the pipes 62 and 64 project downwardly below the bottom wall 44 of the tank 40 and through the opening 34 formed in the bottom wall 14 of the load bed 12. Flexible connecting hoses 78 and 80 are secured between the lower ends of the pipes 62 and 64 and the upper ends of the pipes 28 and 30 which have had their upper end portions, which conventionally extend upward to the opening 36, removed. Accordingly, the tank 40 comprises an upward extension of the tank 26 and as the tank 26 is filled, the remaining portion of fuel discharged into the upper end of the filler pipe 62 will flow into the upper supplemental tank 40 through the openings 70 and 74 while the upper tank 40 is vented through the opening 76 and the portion of the vent pipe 64 disposed above the opening 76.

It will of course be appreciated that the entire expanded fuel system may be filled with fuel through the upper end of the filler pipe 62 and that the float actuated fuel gauge sending unit 82 of the tank 26 will cause the indicator portion (not shown) of the fuel gauge of the pickup truck 10 to register full until all of the fuel within the tank 40 has been exhausted and at least a portion of the fuel within the tank 26 has been exhausted.

With attention now invited more specifically to FIG. 5 of the drawings there may be seen a modified form of expanded fuel system referred to in general by the reference numeral 138 and which is substantially identical to the system 38 except that in addition to the supplemental tank 40 the system 138 includes a second supplemental tank 140 mounted forward of the right-hand wheel well 24. The tank 140 includes the usual filler pipe 162 and vent pipe 164 but also includes an outlet pipe 165 whose inlet end opens upwardly into the lower end of the tank 140 and whose outlet end opens into a T-fitting interposed in the coupling hose 78 which joins the vent pipe 28 to the vent pipe 62. Accordingly, it may be seen that the system 138 represents a more greatly expanded fuel system and that the entire fuel system 138 may be filled either from the left-hand side of the pickup truck or from the right-hand side of the pickup truck 10. With the tanks 40 and 140 disposed forward of the wheel wells 24 and their inner extremities spaced-apart at least the distance between the inner extremities of the wheel wells 24, a conventional pickup truck camper body such as that referred to in general by the reference numeral 168 may be loaded on the load bed 12. The portions of the load space occupied by the tanks 40 and 140 are usually inaccessible after the camper body 168 has been secured on the load bed 12 and accordingly, no usable space is occupied by the tanks 40 and 140. However, the fuel supply system for the pickup truck 10 is greatly increased by the addition of the supplemental tank 40 and further increased by the further addition of the supplemental tank 140.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What I claim as new is as follows:

1. In combination with a vehicle of the type including a first fuel tank provided with upstanding vent and filler pipes therefor, a second supplemental fuel tank spaced above the first tank and including spaced upper and lower wall portions through which spaced portions of said pipes are sealingly secured, said vent pipe being vented to an upper portion of the interior of said supplemental tank and said filler pipe being vented to a lower portion of said supplemental tank.

2. The combination of claim 1 wherein said first tank includes a fuel level indicating assemblage associated therewith operative to indicate the level of fuel therein.

3. The combination of claim 1 wherein said vehicle comprises a truck including a load bed bottom wall beneath which said first tank is positioned and including a wheel well projecting upwardly into one side of the load space above said bottom wall rearward of the forward end of said bottom wall, said pipes projecting upwardly through said bottom wall forward of said wheel well and said second tank being supported above said bottom wall forward of said wheel well.

4. The combination of claim 3 wherein the rear portion of said second tank is contoured to conform to and closely overlie at least the forward portion of said wheel well.

5. The combination of claim 1 wherein said vehicle comprises a truck including a load bed bottom wall beneath which said first tank is positioned and including a wheel well projecting upwardly into one side of the load space above said bottom wall rearward of the forward end of said bottom wall, said pipes projecting upwardly through said bottom wall forward of said wheel well and said second tank being supported above said bottom wall forward of said wheel well, said truck load bed including a second wheel well projecting upwardly into the other side of the load space above said bottom wall, a third tank being supported above said bottom wall forward of said second wheel well and including an outlet pipe extending downwardly through said bottom wall and across said filler pipe and opening into the latter intermediate said first tank and said load bed bottom wall.

6. The combination of claim 5 wherein said third tank includes upwardly projecting filler and vent pipes whereby all three tanks may be filled from either side of said load bed.

7. The combination of claim 1 including a third tank disposed at generally the same elevation as said second tank and including a lower outlet pipe whose discharge end is communicated with the interior of said filler tank intermediate said first and second tanks, said third tank including upwardly projecting filler and vent pipes.

8. The combination of claim 7 wherein said first tank includes a fuel level indicating assemblage associated therewith operative to indicate the level of fuel therein.